United States Patent
Lee et al.

(10) Patent No.: US 12,149,974 B2
(45) Date of Patent: Nov. 19, 2024

(54) ELECTRONIC DEVICE FOR MEASURING QUALITY OF COMMUNICATION AND OPERATION METHOD THEREOF

(71) Applicant: SAMSUNG ELECTRONICS CO., LTD., Suwon-si (KR)

(72) Inventors: Kyoungho Lee, Suwon-si (KR); Sungsick Kim, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 17/571,877

(22) Filed: Jan. 10, 2022

(65) Prior Publication Data

US 2022/0303808 A1 Sep. 22, 2022

Related U.S. Application Data

(63) Continuation of application No. PCT/KR2021/019512, filed on Dec. 21, 2021.

(30) Foreign Application Priority Data

Mar. 16, 2021 (KR) ........................ 10-2021-0033954

(51) Int. Cl.
*H04W 24/10* (2009.01)
*H04L 5/00* (2006.01)
*H04W 76/20* (2018.01)

(52) U.S. Cl.
CPC ........... *H04W 24/10* (2013.01); *H04L 5/0094* (2013.01); *H04W 76/20* (2018.02)

(58) Field of Classification Search
CPC ..... H04W 24/10; H04W 76/20; H04W 76/16; H04W 76/15; H04W 88/06; H04L 5/0094
See application file for complete search history.

(56) References Cited

U.S. PATENT DOCUMENTS

| 11,464,076 B2 | 10/2022 | Kim et al. |
| 2019/0159086 A1 | 5/2019 | Xu et al. |

(Continued)

FOREIGN PATENT DOCUMENTS

| WO | 2020/097215 | 5/2020 |

OTHER PUBLICATIONS

Search Report and Written Opinion issued Mar. 17, 2022 in counterpart International Patent Application No. PCT/KR2021/019512.

*Primary Examiner* — Chuong A Ngo
(74) *Attorney, Agent, or Firm* — Nixon & Vanderhye P.C.

(57) ABSTRACT

Various embodiments provide an electronic device and an operation method thereof, the electronic device comprising: a first communication circuit configured to support first cellular communication; a second communication circuit configured to support second cellular communication; and a processor, wherein the processor is configured to: control the electronic device to receive a radio resource control (RRC) reconfiguration message including information related to a measurement object, in a state in which quality measurement of the second cellular communication is restricted, identify whether the information related to the measurement object comprises information related to a standalone mode of the second cellular communication, determine whether to perform quality measurement using a frequency band corresponding to the standalone mode, based on a result of the identification, and determine whether to transmit a result of the quality measurement, based on a result of the quality measurement.

16 Claims, 12 Drawing Sheets

(56) References Cited

U.S. PATENT DOCUMENTS

| | | |
|---|---|---|
| 2020/0053616 A1 | 2/2020 | Zhu et al. |
| 2020/0351771 A1 | 11/2020 | Geekie et al. |
| 2020/0383010 A1* | 12/2020 | Zhu ..................... H04W 24/10 |
| 2021/0022073 A1 | 1/2021 | Kwok et al. |
| 2021/0029643 A1 | 1/2021 | Stauffer et al. |
| 2021/0044993 A1 | 2/2021 | Jha et al. |
| 2022/0086721 A1 | 3/2022 | Wu |

* cited by examiner

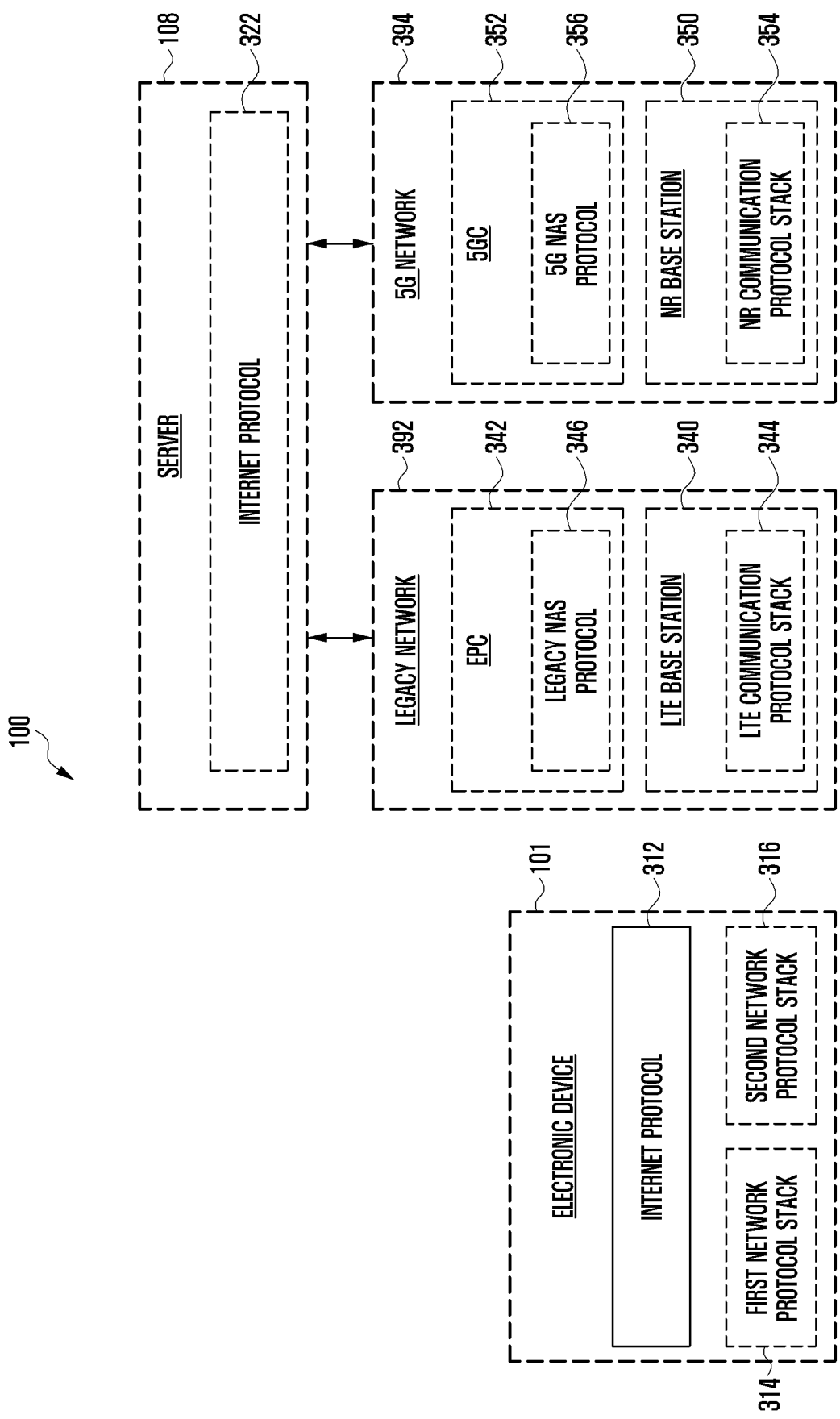

ELECTRONIC DEVICE FOR MEASURING QUALITY OF COMMUNICATION AND OPERATION METHOD THEREOF

CROSS-REFERENCE TO RELATED APPLICATIONS

This application is a continuation of International Application No. PCT/KR2021/019512 designating the United States, filed on Dec. 21, 2021, in the Korean Intellectual Property Receiving Office and claiming priority to Korean Patent Application No. 10-2021-0033954, filed on Mar. 16, 2021, in the Korean Intellectual Property Office, the disclosures of which are incorporated by reference herein in their entireties.

BACKGROUND

Field

The disclosure relates to an electronic device and an operation method thereof, and relates to an electronic device for measuring the quality of communication.

Description of Related Art

In order to satisfy wireless data traffic demands which are increasing after commercialization of the 4G communication system, efforts to develop an improved 5G communication system or pre-5G communication system are being undertaken. For this reason, the 5G communication system or pre-5G communication system is called a beyond 4G network communication system or a post-LTE system. In order to achieve a high data transfer rate, the 5G communication system is considered to be implemented in an ultra-high frequency (mmWave) band (e.g., 60 GHz band) other than a band (a band of 6 GHz or less) used by the LTE. In the 5G communication system, beamforming, massive multiple-input multiple-output (massive MIMO), full dimensional MIMO (FD-MIMO), array antenna, analog beam-forming and large-scale antenna technologies are being discussed.

The 5G mobile communication system may support a non-standalone (NSA) mode in which data is transmitted or received to or from a 4G cellular communication-based base station in and a 5G cellular communication-based base station, and a standalone (SA) mode in which data is transmitted or received to or from the 5G cellular communication-based base station.

An electronic device may include a communication circuit for transmitting or receiving data to or from the 4G cellular communication-based base station and a communication circuit for transmitting or receiving data to or from the 5G cellular communication-based base station. The electronic device may transmit or receive data through two communication circuits in the non-standalone mode.

When an electronic device transmits or receives data in a non-standalone mode, relatively high power consumption and overheating may occur due to operation of two communication circuits. According to a residual capacity or a temperature condition of a battery, the electronic device may switch to first cellular communication or restrict a connection of second cellular communication. As the connection of the second cellular communication is restricted, the electronic device may not perform quality measurement of the second cellular communication. However, upon the operation using a single communication circuit, even though the electronic device can transmit or receive data in a standalone mode requiring low power consumption and a low level of heating, the electronic device cannot quality measurement of the second cellular communication, whereby failure in operation in the standalone mode of the second cellular communication may occur.

SUMMARY

An electronic device according to various example embodiments of the disclosure may include: a first communication circuit configured to support first cellular communication; a second communication circuit configured to support second cellular communication; and a processor, wherein the processor is configured to: control the electronic device to receive a radio resource control (RRC) reconfiguration message including information related to a measurement object, in a state in which quality measurement of the second cellular communication is restricted, identify whether the information related to the measurement object includes information related to a standalone mode of the second cellular communication, determine whether to perform quality measurement using a frequency band corresponding to the standalone mode based on a result of the identification, and determine whether to transmit a result of the quality measurement, based on the result of the quality measurement.

According to various example embodiments, a method of operating an electronic device supporting first cellular communication and/or second cellular communication may include: receiving a radio resource control (RRC) reconfiguration message including information related to a measurement object, in a state in which quality measurement of the second cellular communication is restricted; identifying whether the information related to the measurement object includes information related to a standalone mode of the second cellular communication; determining whether to perform quality measurement using a frequency band corresponding to the standalone mode, based on a result of the identification; and determining whether to transmit a result of the quality measurement, based on the result of the quality measurement.

An electronic device and an operation method thereof according to various example embodiments of the disclosure can identify whether measurement object-related information included in an RRC reconfiguration message includes information related to a standalone mode, and perform a quality measurement operation using a frequency band corresponding to the standalone mode when the information related to the standalone mode is included. In a state in which quality measurement of second cellular communication is restricted, the electronic device may be connected to a node and perform quality measurement using a frequency band corresponding to the standalone mode, whereby data can be transmitted and received through the standalone mode supporting relatively high speed.

An electronic device and an operation method of thereof according to various example embodiments of the disclosure can perform a quality measurement operation using a frequency band corresponding to a standalone mode according to measurement object identification information and/or a report condition included in an RRC reconfiguration message. In a state in which quality measurement of second cellular communication is restricted, the electronic device may be connected to a node and perform quality measurement using a frequency band corresponding to the standalone mode, whereby data can be transmitted and received through the standalone mode supporting relatively high speed.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram illustrating an example protocol stack structure of a network 100 of legacy communication and/or 5G communication according to various embodiments;

DETAILED DESCRIPTION

Figure 1:
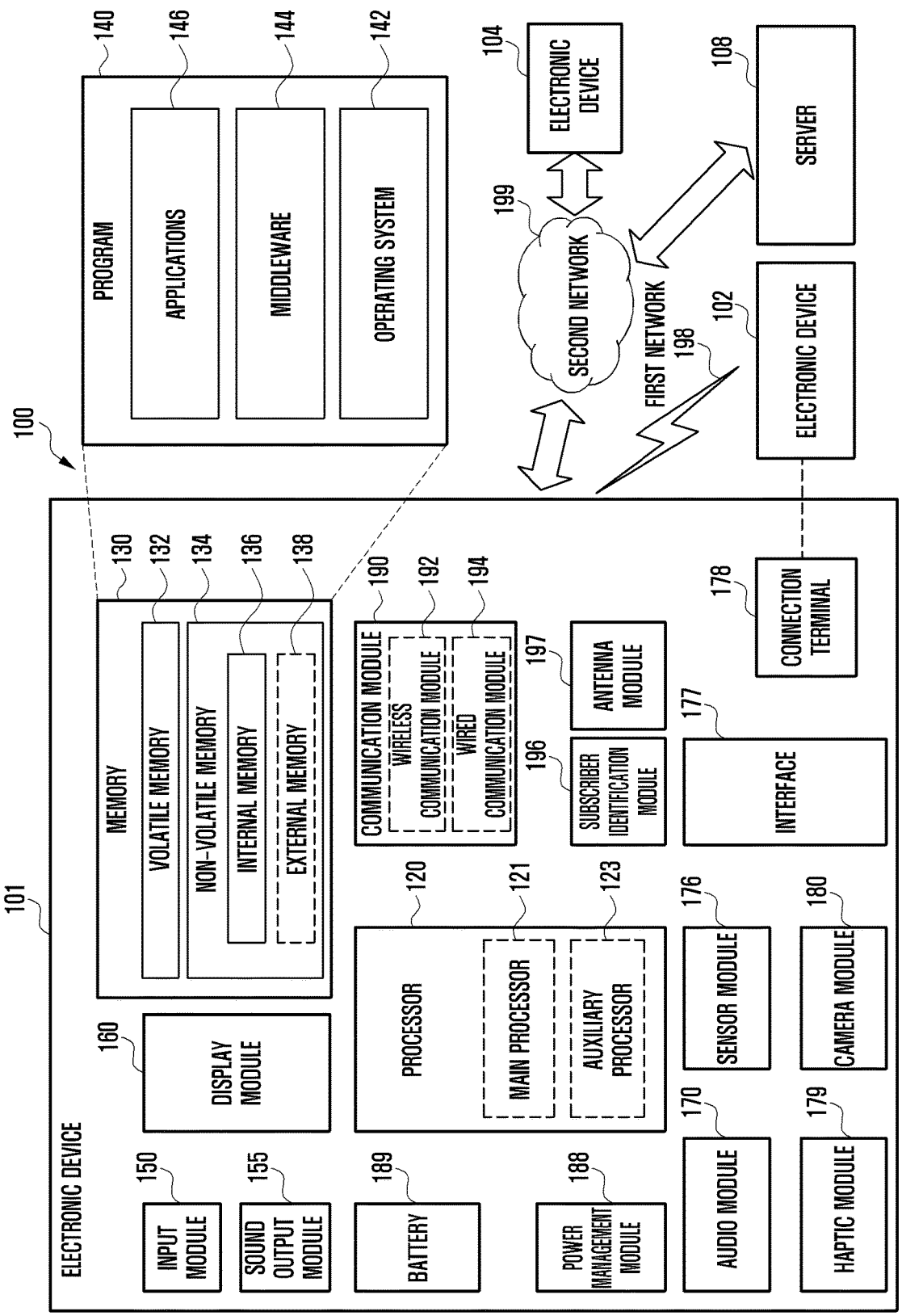
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the 11connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
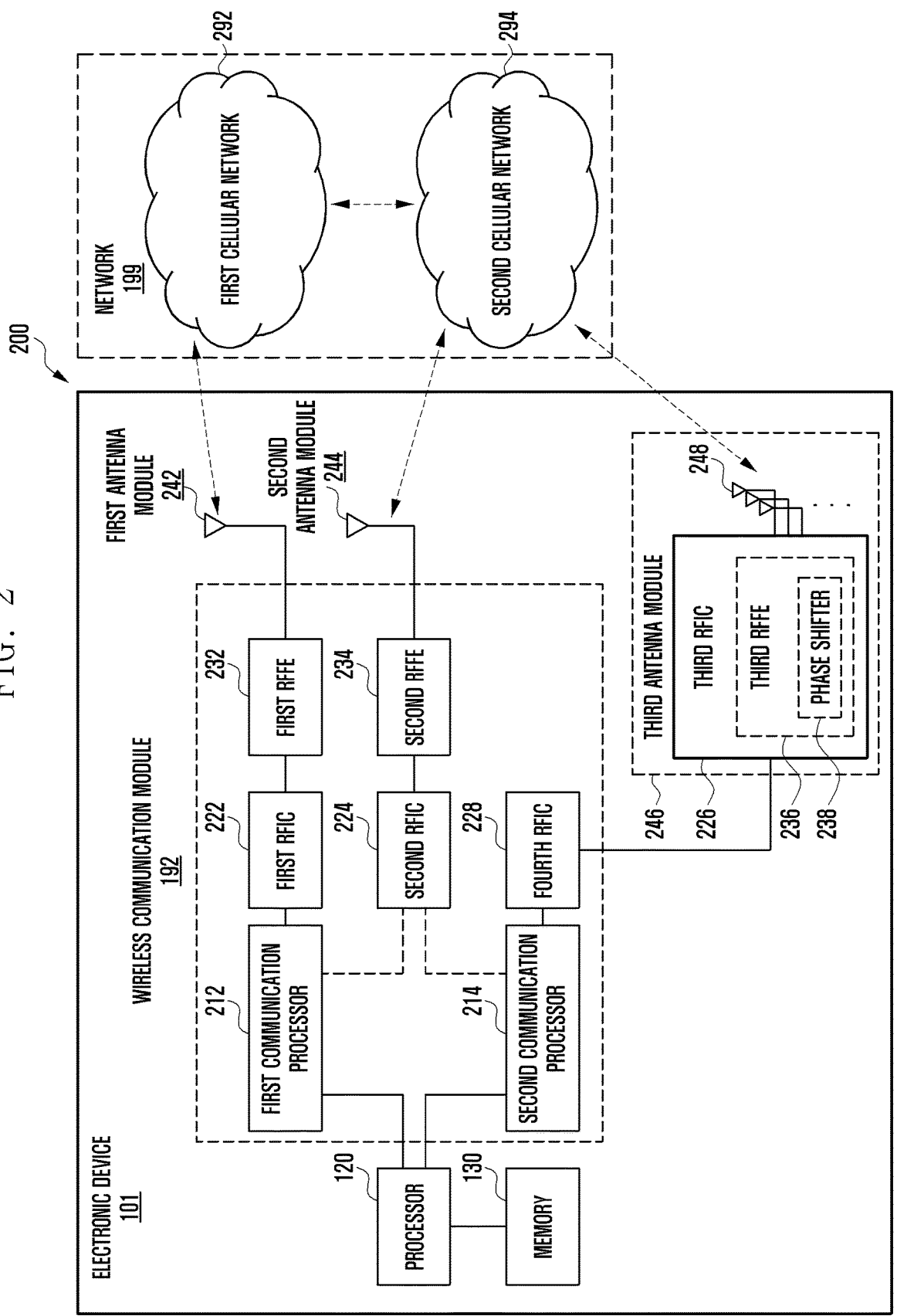
FIG. 2 is a block diagram illustrating an example configuration of an electronic device for supporting legacy network communication and 5G network communication according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226.

The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

FIG. 3 is a diagram illustrating an example protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
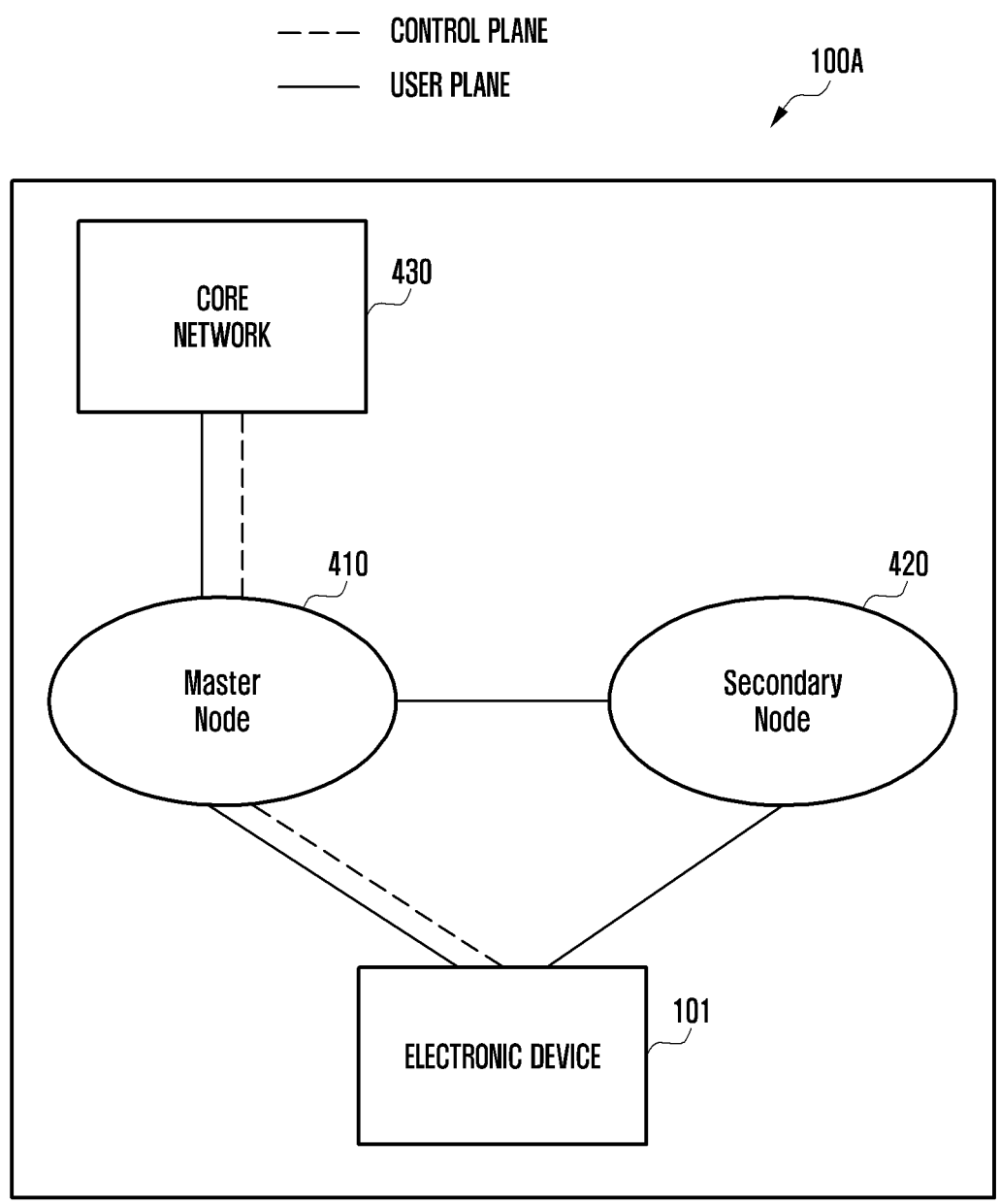
FIGS. 4A, 4B, and 4C are diagrams illustrating example wireless communication systems for providing a legacy communication network and/or a 5G communication network according to various embodiments.
Figure 4B:
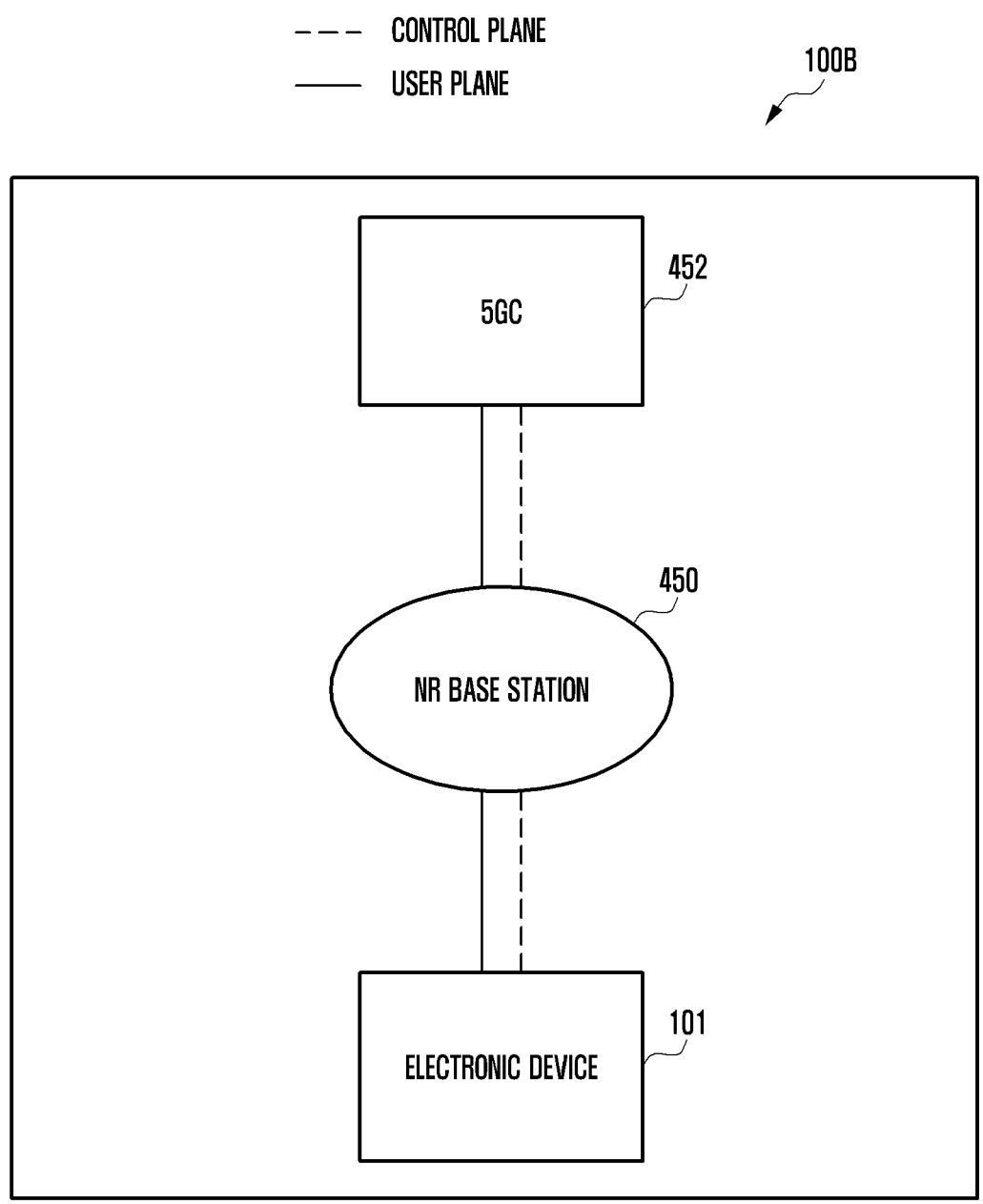
Figure 4C:
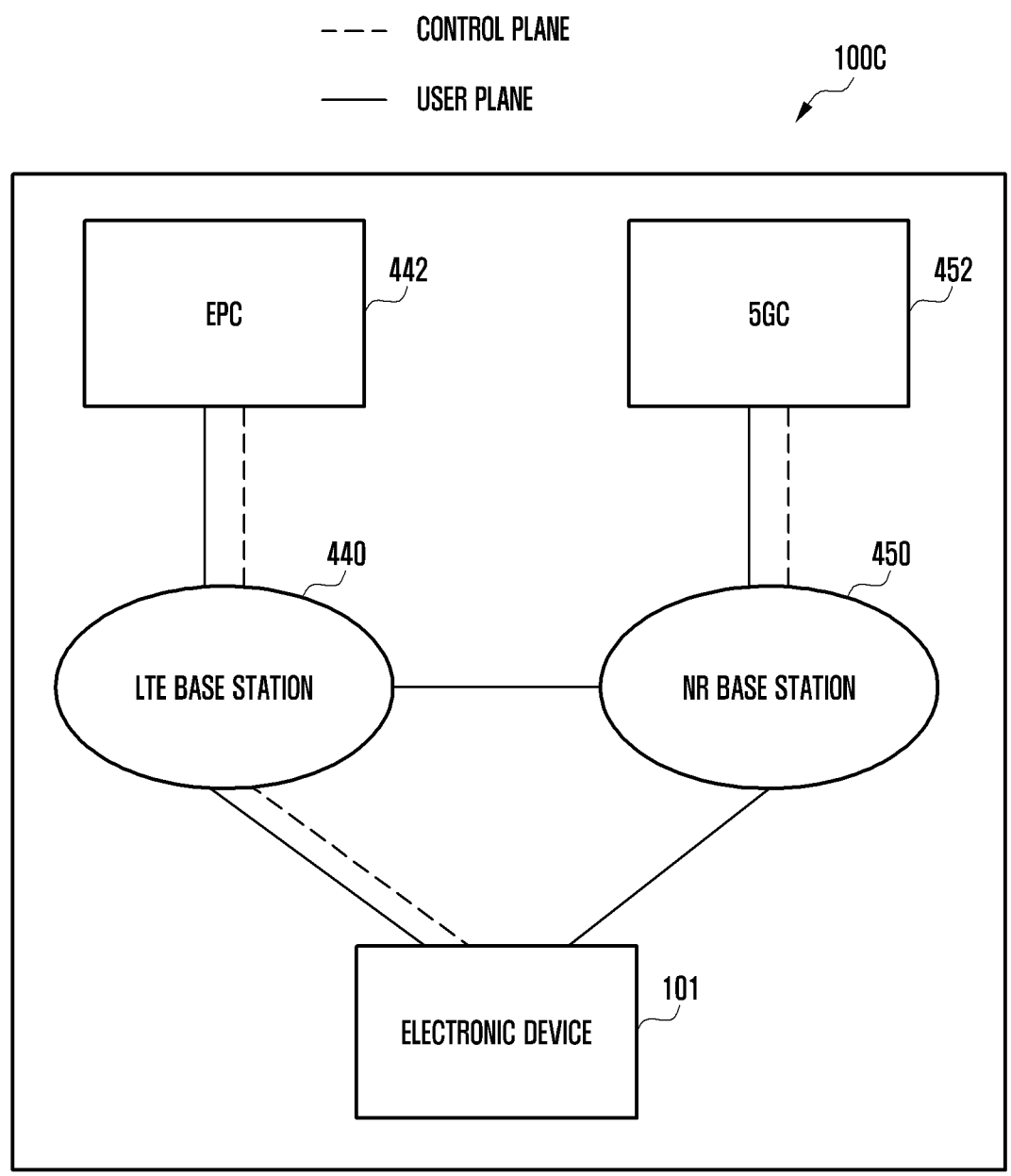

FIG. 4A is a diagram illustrating an example wireless communication system providing a network of legacy communication and/or 5G communication according to various embodiments, FIG. 4B is a diagram illustrating an example wireless communication system providing a network of legacy communication and/or 5G communication according to various embodiments, and FIG. 4C is a diagram illustrating an example wireless communication system providing a network of legacy communication and/or 5G communication according to various embodiments. Referring to FIGS. 4A, 4B and 4C (which may be referred to hereinafter as "FIGS. 4A to 4C"), network environments 100A to 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5th generation core (5GC) 452 for managing 5G communication of the electronic device 101.

According to various embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to various embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to various embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to various embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to various embodiments, the 5G network may independently transmit and receive a control message and user data to and from the electronic device 101.

Referring to FIG. 4C, the legacy network and the 5G network according to various embodiments may independently provide data transmission and reception. For example, the electronic device 101 and the EPC 442 may transmit and receive a control message and user data through the LTE eNB 450. According to an embodiment, the electronic device 101 and the 5GC 452 may transmit and receive a control message and user data through the NR gNB 450.

According to various embodiments, the electronic device 101 may be registered in at least one of the EPC 442 or the 5GC 450 and transmit and receive a control message.

According to various embodiments, the EPC 442 or the 5GC 452 may interwork and manage communication of the electronic device 101. For example, movement information of the electronic device 101 may be transmitted and received through an interface between the EPC 442 and the 5GC 452.

Figure 5:
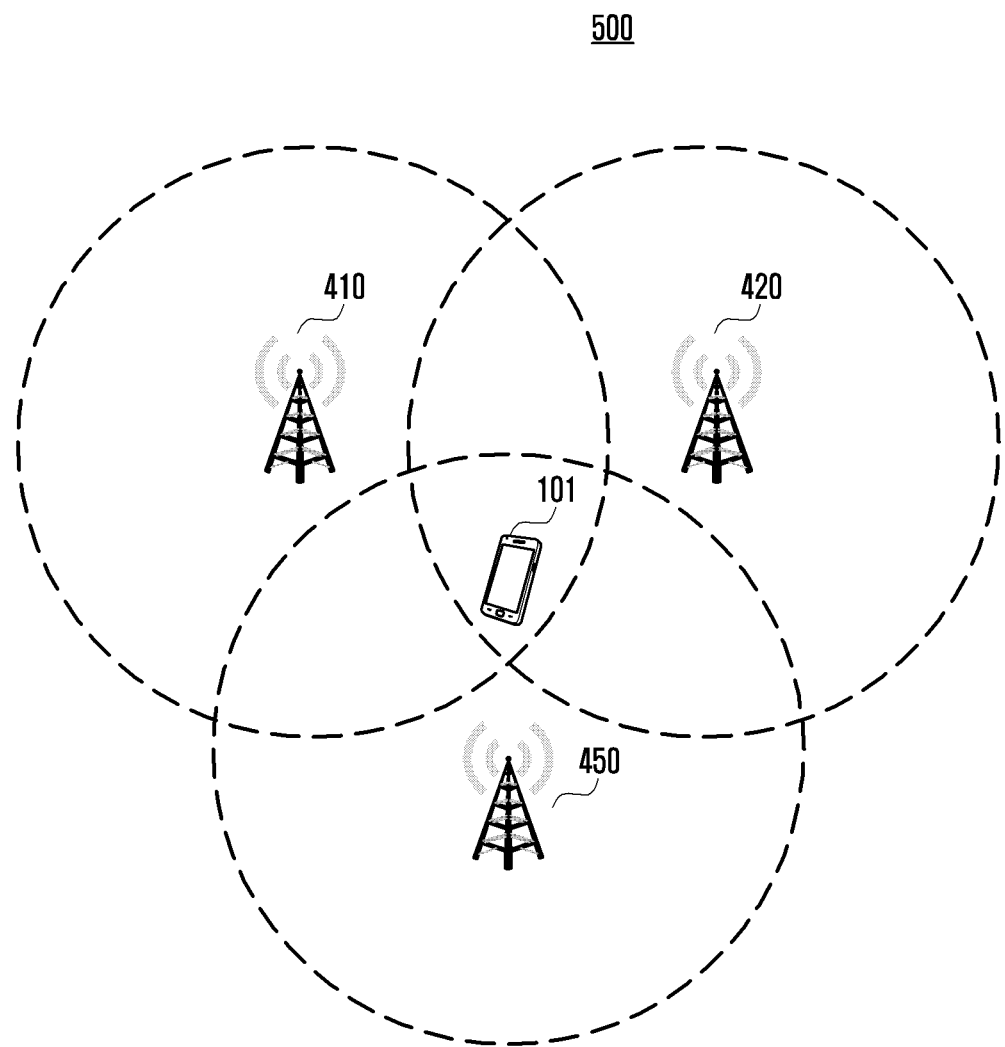
FIG. 5 is a diagram illustrating an electronic device and a cellular network according to various embodiments.

FIG. 5 is a diagram illustrating an electronic device and a cellular network according to various embodiments.

According to various embodiments of the disclosure, a cellular network 500 may include a first node (e.g., the master node 410 of FIG. 4A), a second node (e.g., the secondary node 420 of FIG. 4A), and/or a third node (e.g., the NR base station 450 of FIG. 4B).

According to various embodiments of the disclosure, the first node 410 may include a base station supporting first cellular communication. The first cellular communication may correspond to one of various cellular communication types which can be supported by an electronic device (e.g., the electronic device 101 of FIG. 1), and may refer, for example, to a communication type in, for example, the first cellular network 292 of FIG. 2. For example, the first cellular communication may be a communication type using a 4G mobile communication type (e.g., long-term evolution).

According to various embodiments of the disclosure, the second node 420 may include a base station supporting second cellular communication. The second cellular communication may correspond to one of various cellular communication types which can be supported by the electronic device 101, and may refer, for example, to a communication type in, for example, the second cellular network 294 of FIG. 2. For example, the second cellular communication may be a communication type using a 5G mobile communication type (e.g., new radio). According to an embodiment, the second node 420 may be a base station supporting a non-standalone mode among a standalone mode and/or a non-standalone mode supported by the second cellular communication. The standalone mode may be a mode in which data is transmitted for received using a base station supporting the second cellular communication. The non-standalone mode may be a mode in which data is transmitted or received using a base station supporting the first cellular communication and/or a base station supporting the second cellular communication. The electronic device 101 may be connected to the first node 410 and the second node 420 and transmit or receive data.

According to various embodiments of the disclosure, the third node 450 may include a base station supporting the second cellular communication. According to an embodiment, the third node 450 may include a base station supporting a standalone mode among a standalone mode and/or a non-standalone mode supported by the second cellular communication. The electronic device 101 may be connected to the third node 450 and transmit or receive data.

According to various embodiments of the disclosure, the electronic device 101 may be connected to a node for various reasons. According to an embodiment, the electronic device 101 may be connected to the second node and/or the third node 450 while being connected to the first node 410.

According to various embodiments of the disclosure, for connection to the node, the electronic device 101 may search for a connectable node, measure the quality of a signal transmitted by the found node, and report a measurement result to the connected node or a core network (e.g., the core network 430 of FIG. 4A or 5GC 452 of FIG. 4B) through the connected node. The node connected to the core network or the electronic device 101 may select a node to which the electronic device 101 is to be connected, according to the measurement result transmitted by the electronic device 101, and transmit a message indicating a connection to the selected node to the electronic device 101. In response to reception of the message, the electronic device 101 and the node to be connected may perform an operation of connection between the electronic device 101 and the node to be connected.

According to various embodiments of the disclosure, the electronic device 101 may receive information for node searching, from the connected node. According to an embodiment, the electronic device 101 may receive an RRC reconfiguration message. The RRC reconfiguration message may include information related to a measurement object (e.g., measObject) related to at least one node connectable with the electronic device 101 and/or information related to a report condition (report object) of a measurement result.

The measurement object may correspond, for example, to information required for the electronic device 101 to perform measurement, and may include frequency band information (e.g., channel information) for node searching and node quality measurement for the found node and/or identification information (e.g., a physical cell ID) of a node which outputs a signal of a frequency band included in the frequency band information.

The report condition may correspond, for example, to a condition for reporting of the measured quality, and may include identification information of an event (e.g., B1 event and B2 event) related to the quality report, a designated value (threshold) related to the quality of a signal transmitted by the node, and/or a time (a time to trigger (TTT)) to maintain satisfaction of the condition related to the quality.

According to various embodiments of the disclosure, the electronic device 101 may receive the RRC reconfiguration message from the connected node and identify a measurement object. According to an embodiment, the electronic device 101 may search for a node which broadcasts a signal of the frequency band corresponding to at least one measurement object included in the information related to the measurement object.

According to various embodiments, the electronic device 101 may measure the quality of the found node after completing node searching. The electronic device 101 may measure the quality (e.g., reference signal received power (RSRP) or reference signal received quality (RSRQ)) of the signal broadcasted by the found node and transmit a report message including the measurement result to the connected node. The report message may include a quality measurement result, identification information (e.g., a physical cell ID) of the measured node, and/or identification information of information (e.g., synchronization signal block (SSB)) included in the signal transmitted by the measured node.

According to various embodiments of the disclosure, the electronic device 101 may restrict the quality measurement operation of the node through the second cellular communication for various reasons.

According to an embodiment, since both a communication circuit supporting the first cellular communication and a communication circuit supporting the second cellular communication are operated, data transmission and/or reception through a non-standalone mode may cause higher power consumption (or overheating) compared to data transmission and/or reception through the first cellular communication or data transmission and/or reception through a standalone mode of the second cellular communication. In a state in which the electronic device 101 is connected to the first node 410 and/or the second node 420 supporting communication using the non-standalone mode, when a specific condition is satisfied, the electronic device 101 may perform configuration (e.g., LTE fallback) to transmit or receive data through the first cellular communication in order to reduce the level of heating or reduce power consumption.

When the measured temperature of the electronic device 101 is equal to or greater than (or exceeds) a designated value, the state of the electronic device 101 may switch from a state using the non-standalone mode to a state using the first cellular communication. When a residual battery capacity of the electronic device 101 is equal to or lower than (or below) a designated value, the state of the electronic device 101 may switch from a state using the non-standalone mode to a state using the first cellular communication. When a condition (e.g., throughput) related to data to be transmitted or received satisfies a designated condition (e.g., a condition in which the throughput is equal to or lower than a designated value), the state of the electronic device 101 may switch from a state using the non-standalone mode to a state using the first cellular communication.

A case in which the standalone mode of the second cellular communication is performed may cause lower power consumption and relatively lower heating compared to a case in which the non-standalone mode of the second cellular communication is performed. However, the electronic device 101 is not able to identify whether a node supports a standalone mode or a non-standalone mode, and thus quality measurement through the second cellular communication may be restricted. In this case, the electronic device 101 may fail to perform communication through a standalone mode, which can provide relatively high speed while implementing lower power consumption.

According to various embodiments, in a state in which a call connection (e.g., voice over LTE) through the first cellular communication is performed, the electronic device 101 may restrict quality measurement through the second cellular communication in order to prevent a call connection (e.g., voice over NR) through the standalone mode of the second cellular communication. Even though the electronic device 101 can transmit or receive data through the non-standalone mode of the second cellular communication, the quality measurement through the second cellular communication is restricted, whereby communication through the non-standalone mode, which provides relatively higher speed, may fail to be performed.

According to an embodiment, in a state in which a call connection (e.g., voice over NR) through the standalone mode of the second cellular communication is performed, the electronic device 101 may restrict quality measurement through the second cellular communication in order to prevent or reduce a connection of the non-standalone mode. When handover occurs due to restriction of quality measurement through the second cellular communication, the electronic device 101 may fail to be connected to a node providing the standalone mode.

The embodiments described above correspond to embodiments describing a case caused when the electronic device 101 fails to identify whether a connectable node supports a standalone mode or a non-standalone mode, and hereinafter, an embodiment in which the electronic device 101 can identify a node (e.g., a standalone mode or a non-standalone mode) supported by the connectable node will be described.

Figure 6:
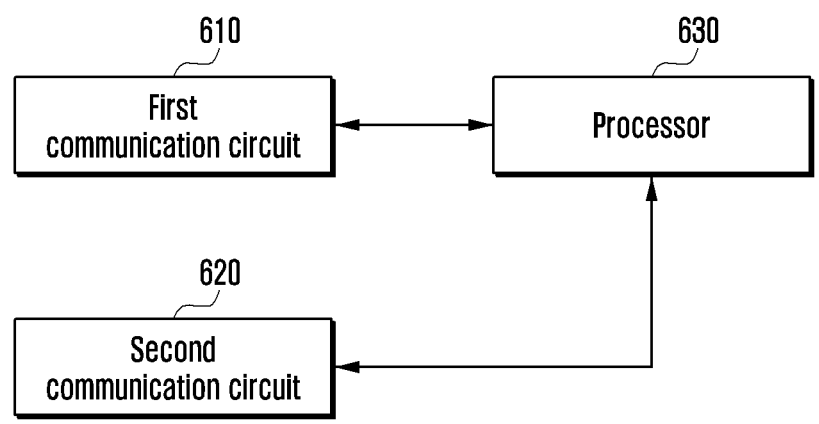
FIG. 6 is a block diagram illustrating an example configuration of an electronic device according to various embodiments.

FIG. 6 is a block diagram illustrating an example configuration of an electronic device according to various embodiments.

Referring to FIG. 6, an electronic device (e.g., the electronic device 101 of FIG. 1) according to various embodiments of the disclosure may include a first communication circuit 610 (e.g., the wireless communication module 192 of FIG. 1), a second communication circuit 620 (e.g., the wireless communication module 192 of FIG. 1), and/or a processor (e.g., including processing circuitry) 630 (e.g., the processor 120 of FIG. 1, the first communication processor 212 of FIG. 2, and/or the second communication processor 242 of FIG. 2).

According to various embodiments of the disclosure, the first communication circuit 610 may correspond to a communication circuit supporting first cellular communication, and may provide communication with an external electronic device (e.g., the external electronic device 104 of FIG. 1) to the electronic device 101 through the first cellular communication. For example, the first communication circuit 610 may be configured to communicate with the external electronic device 104 through first node 410.

According to various embodiments of the disclosure, the second communication circuit 620 may correspond to a communication circuit supporting second cellular communication, and may provide communication with the external electronic device 104 to the electronic device 101 through the second cellular communication. The second communication circuit 620 may support a standalone and/or non-standalone mode of the second cellular communication. The second communication circuit 620 may be configured to communicate with the external electronic device 104 through a third node 450 in a standalone mode of the second cellular communication. The second communication circuit 620 may be configured to communicate with the external electronic device 104 through a second node 420 in a non-standalone mode of the second cellular communication.

According to various embodiments of the disclosure, the processor 630 may be operatively connected to the first communication circuit 610 and/or the second communication circuit 620. The processor 630 may include various processing circuitry and control elements of the electronic device 101. For example, the processor 630 may control elements of the electronic device 101 according to one or more instructions stored in a memory (e.g., the memory 130 of FIG. 1).

According to various embodiments of the disclosure, the processor 630 may control the electronic device 101 to receive information for node searching, from a connected node. The information for node searching may be included in an RRC reconfiguration message, and the processor 630 may receive the RRC reconfiguration message through the first communication circuit 610 and/or the second communication circuit 620.

According to various embodiments of the disclosure, the RRC reconfiguration message may include information related to a measurement object (e.g., measObject) related to at least one node connectable with the electronic device 101 and/or information related to a report condition (report object) of a measurement result.

According to various embodiments of the disclosure, the measurement object may include frequency band information (e.g., channel information) for performing quality measurement and/or identification information (e.g., a physical cell ID) of a node which outputs a signal of a frequency band included in the frequency band information. The processor 630 may receive at least one measurement object through the first communication circuit 610 and/or the second communication circuit 620.

According to various embodiments of the disclosure, the processor 630 may store a list including a previously received measurement object and a newly received measurement object, in the memory 130. The processor 630 may receive information related to the measurement object and a message (e.g., MeasObjectToAddModList) indicating to add the information related to the measurement object to the list, from a base station, and may add the received information related to the measurement object to the list.

At least one measurement object included in the list may have different pieces of identification information (e.g., a measurement ID). The at least one measurement object may include identification information of the measurement object, a channel number corresponding to the frequency band of the measurement object, and identification information (a physical cell ID (PCI)) of a node to be measured.

According to various embodiments of the disclosure, the processor 630 may store a list including previously received report condition-related information and newly received report condition-related information, in the memory 130. The processor 630 may receive a message (e.g., reportConfigToAddModList) indicating to add the report condition-related information to the list, from base station, and may add the received report condition-related information to the list.

According to various embodiments, the report condition-related information included in the RRC reconfiguration message may include a report condition. The report condition may correspond to a condition to report the quality of a signal transmitted by a node, the quality being measured by the electronic device 101, and may include identification information of an event (e.g., A1 event, A2 event, A3 event, A4 event, A5 event, B1 event, and/or B2 event) related to a quality report, a designated value (threshold) related to the quality of the signal transmitted by the node, and/or a time (time to trigger (TTT)) to maintain satisfaction of a condition related to the quality.

According to various embodiments of the disclosure, the processor 630 may receive information related to the measurement object and identify whether information related to the measurement object includes information related to the standalone mode of the second cellular communication. Upon the result of the identification, the processor 630 may determine whether to perform a quality measurement operation using a frequency band corresponding to the standalone mode.

According to various embodiments of the disclosure, the measurement object included in the information related to the measurement object may include information (e.g., carrier frequency information (carrierFreq-r15)) relating to a frequency band used to search for a node by the electronic device 101. The carrier frequency information may include a carrier frequency of a frequency band to be used for node searching, quality measurement, and/or connection. According to various embodiments of the disclosure, the measurement object may be implemented to distinguish between information relating to a frequency band for quality measurement of a node supporting a non-standalone mode and information relating to a frequency band for quality measurement of a node supporting a standalone mode. For example, the measurement object may include carrier frequency band information (carrierFreq-r15) for quality measurement of a node supporting a non-standalone mode and/or carrier frequency band information (carrierFre-r16) for quality measurement of a node supporting a standalone mode. The processor 630 may identify whether the information related to the measurement object includes the carrier frequency band information for quality measurement of the node supporting the standalone mode. The processor 630 may control the second communication circuit 620 to perform the quality measurement operation using the frequency band corresponding to the standalone mode, when it is identified that the information related to the measurement object includes the information related to the carrier frequency band information for quality measurement of the node supporting the standalone mode.

According to various embodiments of the disclosure, the measurement object included in the information related to the measurement object may include an indicator indicating whether the measurement object corresponds to a measurement object for performing a standalone mode. A value of an indicator corresponding to the measurement object for performing the standalone mode may be different from a value of an indicator corresponding to a measurement object which does not correspond to the measurement object for performing the standalone mode. The processor 630 may parse the information related to the measurement object, and may identify an indicator indicating whether the measurement object included in the information related to the measurement object corresponds to a measurement object performing the standalone mode. The processor 630 may control the second communication circuit 620 to perform the quality measurement operation using the frequency band corresponding to the standalone mode when it is identified that the measurement object corresponds to the measurement object for performing the standalone mode.

According to various embodiments of the disclosure, the measurement object included in the information related to the measurement object may be implemented to distinguish between a measurement object for performing the standalone mode and a measurement object for performing the non-standalone mode. According to an embodiment, at least partial field of the measurement object (e.g., measObjectNR_SA) for performing the standalone mode and at least partial field of the measurement object (e.g., measObjectNR_NSA) for performing the non-standalone mode may be differently implemented, and the processor 630 may identify whether the measurement object corresponds to a measurement object for performing the standalone mode, according to the parsing of the measurement object. The processor 630 may control the second communication circuit 620 to perform the quality measurement operation using the frequency band corresponding to the standalone mode when it is identified that the measurement object corresponds to a measurement object for performing the standalone mode.

According to various embodiments of the disclosure, the processor 630 may control the second communication circuit 620 to perform the quality measurement operation using the frequency band corresponding to the standalone mode when the information related to the standalone mode is included in the information related to the measurement object. The processor 630 may control the first communication circuit 610 and/or the second communication circuit 620 to perform the quality measurement operation using the frequency band corresponding to the non-standalone mode when the information related to the non-standalone mode is included in the information related to the measurement object.

According to various embodiments of the disclosure, the processor 630 may receive information related to a report condition and identify whether the information related the report condition includes information related to a standalone mode of second cellular communication. Upon the result of the identification, the processor 630 may determine whether to perform a quality measurement operation using a frequency band corresponding to the standalone mode.

The report condition according to various embodiments of the disclosure may be configured to be distinguished according to a standalone mode and/or a non-standalone mode. The report condition may include a condition related to the quality of a node supporting the standalone mode and/or a condition related to the quality of a node supporting the non-standalone mode. For example, the condition related to the quality of the node supporting the standalone mode may include a condition in which the quality of a signal of a node, which is adjacent to but not connected to the electronic device 101 and supports a standalone mode, is equal to or greater than a designated value, and a condition in which the quality of a signal of a node which is connected to the electronic device 101 is equal to or lower than a designated value, and the quality of a signal of a node, which is adjacent to but not connected to the electronic device 101 and supports a standalone mode, is equal to or greater than the designated value. The condition related to the quality of a node supporting the non-standalone mode may include a condition in which the quality of a signal of a node, which is adjacent to but not connected to the electronic device 101 and supports a non-standalone mode, is equal to or greater than a designated value, and a condition in which the quality of a signal of a node which is connected to the electronic device 101 is equal to or lower than a designated value, and the quality of a signal of a node, which is adjacent to but not connected to the electronic device 101 and supports a non-standalone mode, is equal to or greater than the designated value.

According to various embodiments of the disclosure, the processor 630 may determine to perform the quality measurement operation using the frequency band corresponding to the standalone mode when it is identified that the condition related to the quality of the node supporting the standalone mode is included in the report condition.

According to various embodiments of the disclosure, in a state in which the quality measurement operation of the node through the second cellular communication is restricted for various reasons, according to information related to the measurement object and/or the information related to the report condition, the processor 630 may perform the quality measurement operation using the frequency band corresponding to the standalone mode.

According to an embodiment, when the measured temperature of the electronic device 101 is equal to or greater than (or exceeding) a designated value, the processor 630 may switch the state from a state using the standalone mode of the second cellular communication to a state using the first cellular communication, and thus the quality measurement operation through the second cellular communication may be restricted. The processor 630 may perform the quality measurement operation using the frequency band corresponding to the standalone mode when the information related to the measurement object and/or the information related to the report condition includes the information related to the standalone mode.

According to an embodiment, when a residual capacity of a battery of the electronic device 101 is equal to or lower than (or below) a designated value, the processor 630 may switch the state from a state using the non-standalone mode of the second cellular communication and a state using the first cellular communication, and thus the quality measurement operation through the second cellular communication may be restricted. The processor 630 may perform the quality measurement operation using the frequency band corresponding to the standalone mode when the information related to the measurement object and/or the information related to the report condition includes the information related to the standalone mode.

According to an embodiment, when a condition (e.g., throughput) related to transmitted or received data satisfies a designated condition (e.g., a condition in which the throughput is equal to or less than a designated value), the processor 630 may switch the state from a state using the non-standalone mode of the second cellular communication to a state using the first cellular communication, and thus the quality measurement operation through the second cellular communication may be restricted. The processor 630 may perform the quality measurement operation using the frequency band corresponding to the standalone mode when it is identified that the information related to the measurement object and/or the information related to the report condition includes the information related to the standalone mode.

According to an embodiment, the processor 630 may restrict quality measurement through the second cellular communication in order to prevent a call connection (e.g., voice over NR) through the standalone mode of the second cellular communication in a state in which a call connection (e.g., voice over LTE) through the first cellular communication is performed. The processor 630 may perform the quality measurement operation using the frequency band corresponding to the non-standalone mode when it is identified that the information related to the measurement object and/or the information related to the report condition includes the information related to the non-standalone mode.

According to an embodiment, the processor 630 may restrict quality measurement through the second cellular communication in order to prevent connection of the non-standalone mode of the second cellular communication in a state in which a call connection (e.g., voice over NR) through the standalone mode of the second cellular communication is performed. The processor 630 may perform the quality measurement operation using the frequency band corresponding to the standalone mode when it is identified that the information related to the measurement object and/or the information related to the report condition includes the information related to the standalone mode.

When the quality of a signal transmitted by a specific node satisfies a designated condition included in the report condition after measuring the quality, the processor 630 may transmit the quality measurement result to the connected node and perform one or more procedures for a connection to the specific node.

The processor 630 may release a part of restriction of the quality measurement through the second cellular communication (e.g., perform a quality measurement operation using a frequency band corresponding to a standalone mode), so as to perform data transmission or reception through a standalone mode which can provide relatively high speed while consuming lower power.

The various example embodiments described above may require some amendments to the standard defined in relation to the measurement object and/or the report condition (report config). However, without some amendments to the standard, according to details defined between a cellular network (e.g., the cellular network 500 of FIG. 5) and the electronic device 101, the electronic device 101 may perform a quality measurement operation using a frequency band corresponding to a standalone mode or a quality measurement operation using a frequency band corresponding to a non-standalone mode even in a state in which a quality measurement operation of second cellular communication is restricted.

According to various embodiments of the disclosure, the processor 630 may store data indicating whether to perform a quality measurement operation according to identification information of a measurement object, in the memory 130. The data may correspond to data including details defined between a manufacturer of the electronic device 101 and a business operator of the cellular communication network 500. For example, the manufacturer of the electronic device 101 and the business operator of the cellular communication network 500 may configure the identification information corresponding to the measurement object for performing a non-standalone with a value equal to or less than (or equal to or larger than) a designated value, and configure identification information corresponding to the measurement object for performing a standalone mode with a value equal to or larger than (or equal to or less than) a designated value. The processor 630 may determine whether to perform the quality measurement according to the identification information of the measurement object and data indicating whether to perform the quality measurement operation according to the identification information.

According to an embodiment, in a state in which a quality measurement operation of the second cellular communication is restricted, when it is identified that the identification information of the measurement object is equal to or greater than a designated value, the processor 630 may perform the quality measurement operation using the frequency band corresponding to the standalone mode. In a state in which a quality measurement operation of the second cellular communication is restricted, when it is identified that the identification information of the measurement object is equal to or less than a designated value, the processor 630 may control the second communication circuit 620 to maintain the restriction of the quality measurement operation of the second cellular communication.

According to various embodiments of the disclosure, the manufacturer of the electronic device 101 and the business operator of the cellular communication network 500 may configure the report condition corresponding to the measurement object for performing a non-standalone with a designated condition (e.g., TTT equal to or less than a designated value), and configure the report condition corresponding to the measurement object for performing a non-standalone mode with a designated value (e.g., TTT equal to or greater than a designated value). The processor 630 may store data indicating whether to perform the quality measurement operation according to the report condition, in the memory 130.

The processor 630 may determine whether to perform the quality measurement, according to the report condition of the measurement object and the data indicating whether to perform the quality measurement operation according to the report condition.

According to an embodiment, in a state in which the quality measurement operation of the second cellular communication is restricted, when it is identified that the report condition (e.g., TTT) of the measurement object is equal to or less than a designated value, the processor 630 may perform the quality measurement operation using the frequency band corresponding to the standalone mode of the second cellular communication. In a state in which the quality measurement operation of the second cellular communication is restricted, when it is identified that the report condition (e.g., TTT) of the measurement object is equal to or greater than a designated value, the processor 630 may control the second communication circuit 620 to maintain the restriction of the quality measurement operation of the second cellular communication.

According to various embodiments of the disclosure, the manufacturer of the electronic device 101 and the business operator of the cellular communication network 500 may configure the report condition corresponding to the measurement object for performing a standalone mode with a designated condition (e.g., a parameter for reporting a communication quality (e.g., B1 threshold) is equal to or less than a designated value), and configure the report condition corresponding to the measurement object for performing a non-standalone mode with a designated value (e.g., a parameter for reporting a communication quality is equal to or larger than a designated value). The processor 630 may store data indicating whether to perform the quality measurement operation according to the report condition, in the memory 130.

The processor 630 may determine whether to perform the quality measurement, according to the report condition of the measurement object and the data indicating whether to perform the quality measurement operation according to the report condition.

According to an embodiment, in a state in which the quality measurement operation of the second cellular communication is restricted, when it is identified that the report condition (e.g., B1 threshold) of the measurement object is equal to or less than a designated value, the processor 630 may perform the quality measurement operation using the frequency band corresponding to the standalone mode. In a state in which the quality measurement operation of the second cellular communication is restricted, when it is identified that the report condition (e.g., B1 threshold) of the measurement object is equal to or greater than a designated value, the processor 630 may control the second communication circuit 620 to maintain the restriction of the quality measurement operation of the second cellular communication.

Figure 7:
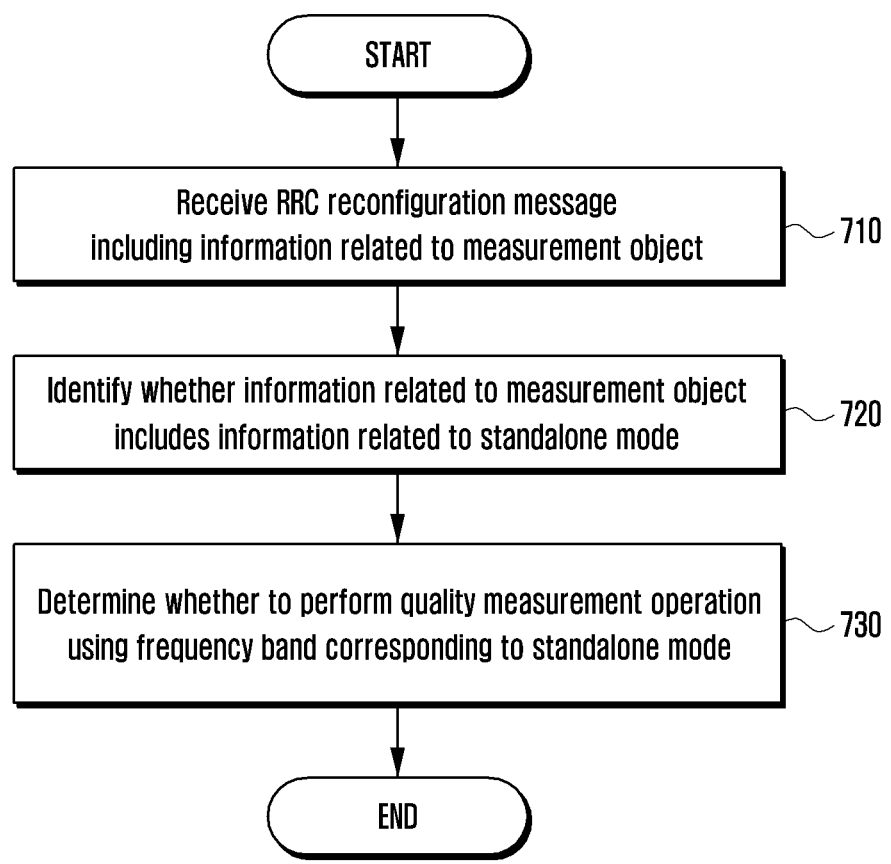
FIG. 7 is a flowchart illustrating an example method of operating an electronic device according to various embodiments.

FIG. 7 is a flowchart illustrating an example method 700 of operating an electronic device according to various embodiments.

According to various embodiments of the disclosure, in operation 710, an electronic device (e.g., the electronic device 101 of FIG. 6) may receive an RRC reconfiguration message including information related to a measurement object.

According to various embodiments of the disclosure, the RRC reconfiguration message may include information related to a measurement object (e.g., measObject) related to at least one node connectable with the electronic device 101 and/or information related to a report condition (e.g., report object) of a measurement result.

According to various embodiments of the disclosure, the measurement object may include frequency band information (e.g., channel information) for performing measurement and/or identification information (e.g., a physical cell ID) of a node outputting a signal of a frequency band included in the frequency band information. The electronic device 101 may receive one or more measurement objects through a first communication circuit 610 and/or a second communication circuit 620.

According to various embodiments of the disclosure, in operation 720, the electronic device 101 may identify whether the information related to the measurement object includes information related to a standalone mode of second cellular communication.

According to various embodiments of the disclosure, a measurement object included in the information related to the measurement object may include information (e.g., carrier frequency information (e.g., carrierFreq-r15)) relating to a frequency band used to search for a node by the electronic device 101. The carrier frequency information may include a carrier frequency of a frequency band used for node searching, quality measurement, and/or connection. According to various embodiments of the disclosure, the measurement object may be implemented to distinguish between information relating to a frequency band for quality measurement of a node supporting a non-standalone mode of the second cellular communication and information relating to a frequency band for quality measurement of a node supporting a standalone mode. For example, the measurement object may include carrier frequency band information (e.g., carrierFreq-r15) for quality measurement of a node supporting a non-standalone mode and/or carrier frequency band information (e.g., carrierFre-r16) for quality measurement of a node supporting a standalone mode. The electronic device 101 may identify whether the information related to the measurement object includes the carrier frequency band information for quality measurement of the node supporting the standalone mode.

According to various embodiments of the disclosure, the measurement object included in the information related to the measurement object may include an indicator indicating whether the measurement object corresponds to a measurement object for performing a standalone mode. A value of an indicator corresponding to the measurement object for performing the standalone mode may be different from a value of an indicator corresponding to a measurement object which does not correspond to the measurement object for performing the standalone mode. The electronic device 101 may parse the information related to the measurement object, and may identify an indicator indicating whether the measurement object included in the information related to the measurement object corresponds to a measurement object performing the standalone mode.

According to various embodiments of the disclosure, the measurement object included in the information related to the measurement object may be implemented to be distinguished between a measurement object for performing a standalone mode and a measurement object for performing a non-standalone mode. According to an embodiment, at least partial field of a measurement object (e.g., measObjectNR_SA) for performing the standalone mode and at least partial field of a measurement object (e.g., measObjectNR_NSA) for performing the non-standalone mode may be differently implemented, and the electronic device 101 may identify whether the measurement object corresponds to a measurement object for performing the standalone mode, according to the parsing of the measurement object.

According to various embodiments of the disclosure, in operation 730, the electronic device 101 may determine whether to perform a quality measurement operation using a frequency band corresponding to the standalone mode, according to whether the information related to the measurement object includes the information related to the standalone mode.

According to various embodiments of the disclosure, when it is identified that the information related to the measurement object includes the information related to the standalone mode, the electronic device 101 may determine to perform the quality measurement operation using the frequency band corresponding to the standalone mode.

When it is identified that the information related to the measurement object includes the carrier frequency band information for quality measurement of a node supporting the standalone mode, the electronic device 101 may control the second communication circuit 620 to perform the quality measurement operation using the frequency band corresponding to the standalone mode.

When it is identified that the measurement object corresponds to a measurement object for performing the standalone mode, the electronic device 101 may control the second communication circuit 620 to perform the quality measurement operation using the frequency band corresponding to the standalone mode.

When it is identified that the measurement object corresponds to a measurement object for performing the standalone mode, the electronic device 101 may control the second communication circuit 620 to perform the quality measurement operation using the frequency band corresponding to the standalone mode.

According to various embodiments of the disclosure, in a state in which the quality measurement operation of a node through the second cellular communication is restricted for various reasons, the electronic device 101 may perform the quality measurement operation using the frequency band corresponding to the standalone mode, according to the information related to the measurement object and/or the information related to the report condition.

Figure 8:
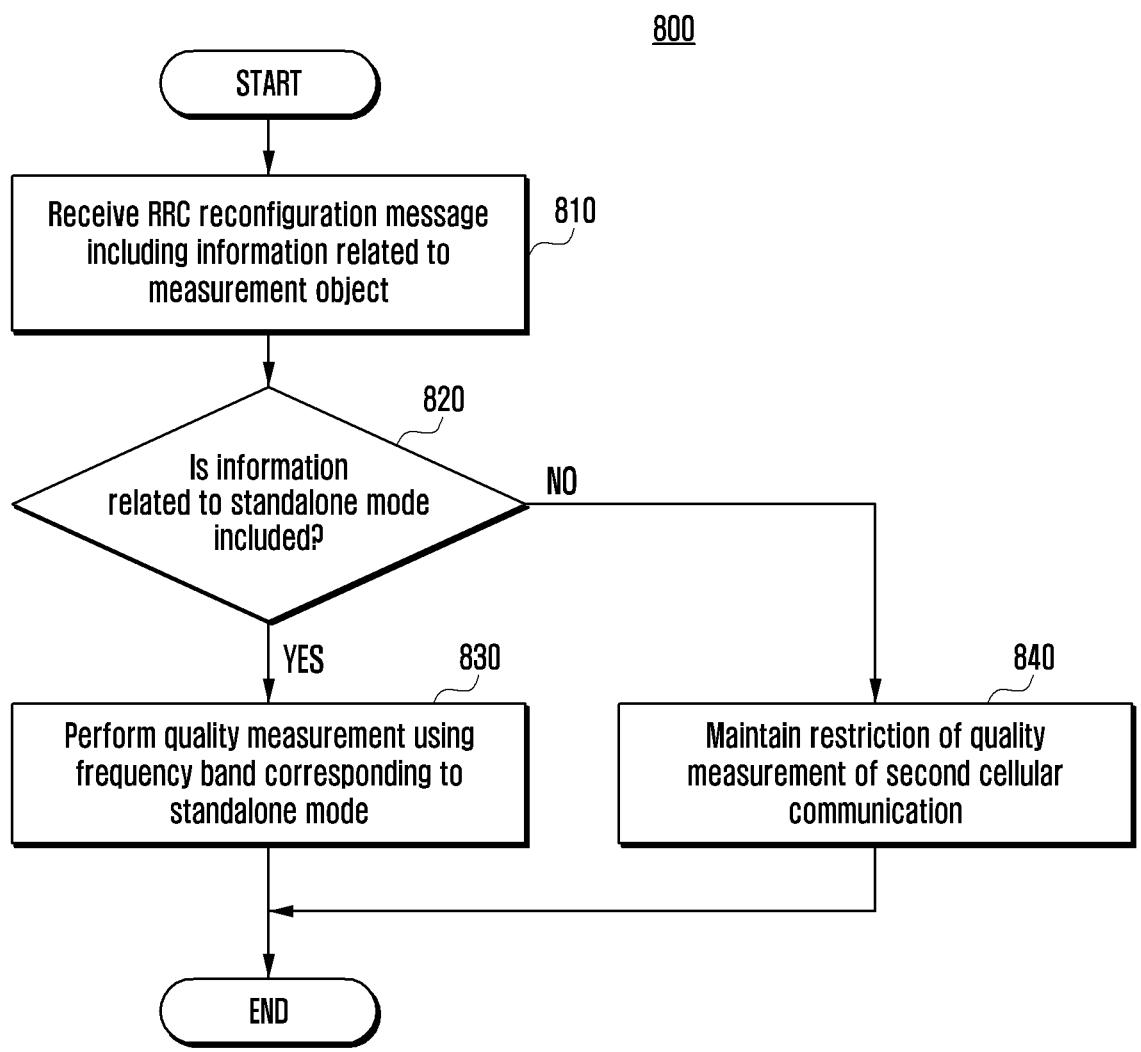
FIG. 8 is a flowchart illustrating an example of determining, by an electronic device, whether to perform quality measurement, according to whether information related to a measurement object includes information related to a standalone mode, according to various embodiments.

FIG. 8 is a flowchart illustrating an example operation 800 of determining, by an electronic device, whether to perform quality measurement, according to whether information related to a measurement object includes information related to a standalone mode, according to various embodiments.

The electronic device 101 in an embodiment of FIG. 8 may be in a state in which the electronic device 101 is connected to first cellular communication and quality measurement through second cellular communication is restricted due to various reasons (e.g., the temperature of the electronic device 101, residual power of the electronic device 101, and/or throughput).

According to various embodiments of the disclosure, in operation 810, an electronic device (e.g., the electronic device 101 of FIG. 6) may receive an RRC reconfiguration message including information related to a measurement object.

According to various embodiments of the disclosure, the RRC reconfiguration message may include information related to a measurement object (e.g., measObject) related to at least one node connectable with the electronic device 101 and/or information related to a report condition (report object) of a measurement result.

According to various embodiments of the disclosure, the measurement object may include frequency band information (e.g., channel information) for performing measurement and/or identification information (e.g., a physical cell ID) of a node outputting a signal of a frequency band included in the frequency band information. The electronic device 101 may receive one or more measurement objects through a first communication circuit 610 and/or a second communication circuit 620.

According to various embodiments of the disclosure, in operation 820, the electronic device 101 may identify whether the information related to the measurement object includes information related to a standalone mode of second cellular communication.

According to various embodiments of the disclosure, a measurement object included in the information related to the measurement object may include information (e.g., carrier frequency information (e.g., carrierFreq-r15)) relating to a frequency band used to search for a node by the electronic device 101. The carrier frequency information may include a carrier frequency of a frequency band used for node searching, quality measurement, and/or connection. According to various embodiments of the disclosure, the measurement object may be implemented to distinguish between information relating to a frequency band for quality measurement of a node supporting a non-standalone mode of the second cellular communication and information relating to a frequency band for quality measurement of a node supporting a standalone mode. For example, the measurement object may include carrier frequency band information (e.g., carrierFreq-r15) for quality measurement of a node supporting a non-standalone mode and/or carrier frequency band information (e.g., carrierFre-r16) for quality measurement of a node supporting a standalone mode. The electronic device 101 may identify whether the information related to the measurement object includes the carrier frequency band information for quality measurement of the node supporting the standalone mode.

According to various embodiments of the disclosure, the measurement object included in the information related to the measurement object may include an indicator indicating whether the measurement object corresponds to a measurement object for performing a standalone mode. A value of an indicator corresponding to the measurement object for performing the standalone mode may be different from a value of an indicator corresponding to a measurement object which does not correspond to the measurement object for performing the standalone mode. The electronic device 101 may parse the information related to the measurement object, and may identify an indicator indicating whether the measurement object included in the information related to the measurement object corresponds to a measurement object performing the standalone mode.

According to various embodiments of the disclosure, the measurement object included in the information related to the measurement object may be implemented to be distinguished between a measurement object for performing a standalone mode and a measurement object for performing a non-standalone mode. According to an embodiment, at least partial field of a measurement object (e.g., measObjectNR_SA) for performing the standalone mode and at least partial field of a measurement object (e.g., measObjectNR_NSA) for performing the non-standalone mode may be differently implemented, and the electronic device 101 may identify whether the measurement object corresponds to a measurement object for performing the standalone mode, according to the parsing of the measurement object.

According to various embodiments of the disclosure, when it is identified that the information related to the measurement object includes the information related to the standalone mode (if "Yes" in operation 820), the electronic device 101 may perform quality measurement using a frequency band corresponding to the standalone mode in operation 830.

According to various embodiments of the disclosure, when it is identified that the information related to the measurement object includes the information related to the standalone mode, the electronic device 101 may determine to perform a quality measurement object using the frequency band corresponding to the standalone mode.

When it is identified that the information related to the measurement object includes carrier frequency band information for quality measurement of a node supporting the standalone mode, the electronic device 101 may control the second communication circuit 620 to perform the quality measurement operation using the frequency band corresponding to the standalone mode.

The electronic device 101 may release a part of restriction of the quality measurement through the second cellular communication (e.g., perform a quality measurement operation using a frequency band corresponding to a standalone mode), so as to perform data transmission or reception through a standalone mode which can provide relatively high speed while consuming lower power.

According to various embodiments of the disclosure, when it is identified that the information related to the measurement object does not include information related to the standalone mode (if "No" in operation 820), the electronic device 101 may maintain the restriction of the quality measurement of the second cellular communication in operation 840.

The electronic device 101 may not perform communication through a non-standard mode, which causes relatively higher power consumption (or overheating), by maintaining the restriction of the quality measurement of the second cellular communication.

Figure 9:
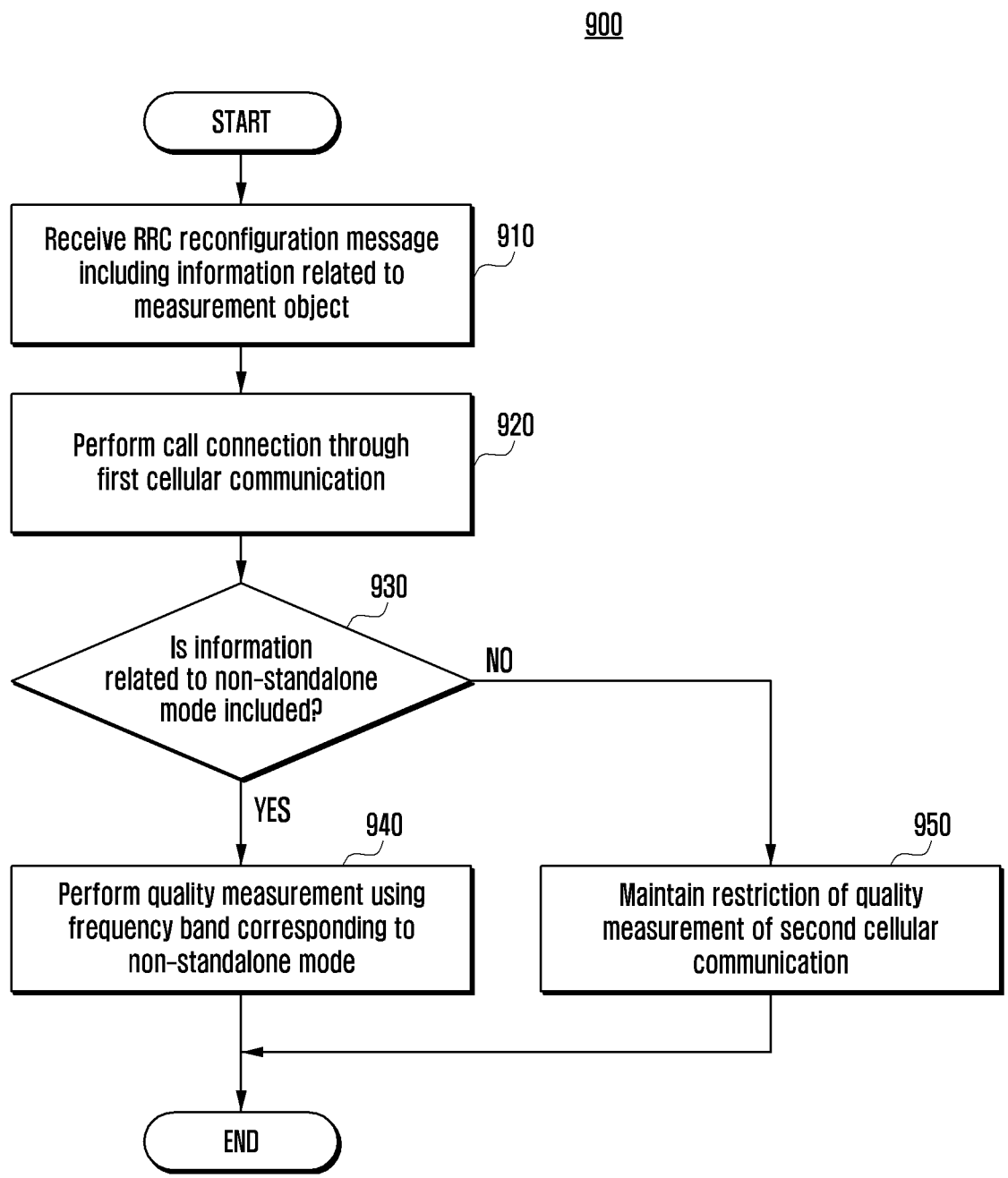
FIG. 9 is a flowchart illustrating an example of determining, by an electronic device, whether to perform quality measurement, according to whether information related to a measurement object includes information related to a non-standalone mode, according to various embodiments.

FIG. 9 is a flowchart illustrating an example operation 900 of determining, by an electronic device, whether to perform quality measurement according to whether information related to a measurement object includes information related to a non-standalone mode, according to various embodiments.

According to various embodiments of the disclosure, in operation 910, an electronic device (e.g., the electronic device 101 of FIG. 6) may receive an RRC reconfiguration message including information related to a measurement object.

According to various embodiments of the disclosure, the RRC reconfiguration message may include information related to a measurement object (e.g., measObject) related to at least one node connectable with the electronic device 101 and/or information related to a report condition (report object) of a measurement result.

According to various embodiments of the disclosure, the measurement object may include frequency band information (e.g., channel information) for performing measurement and/or identification information (e.g., a physical cell ID) of a node outputting a signal of a frequency band included in the frequency band information. The electronic device 101 may receive one or more measurement objects through a first communication circuit 610 and/or a second communication circuit 620.

According to various embodiments of the disclosure, in operation 920, the electronic device 101 may perform a call connection through first cellular communication.

In a state in which the electronic device 101 performs a call connection (e.g., voice over LTE) through the first cellular communication, the electronic device 101 may restrict quality measurement through second cellular communication in order to prevent a call connection (e.g., voice over NR) through a standalone mode of the second cellular communication.

The electronic device 101 may perform a call connection through the first cellular communication in a non-standalone mode of the second cellular communication. Even though the electronic device 101 can transmit or receive data through the non-standalone mode of the second cellular communication, the quality measurement through the second cellular communication is restricted, whereby communication through the non-standalone mode, which provides relatively higher speed, may fail to be performed.

According to various embodiments of the disclosure, in operation 930, the electronic device 101 may identify whether the information related to the measurement object includes information related to the non-standalone mode.

According to various embodiments of the disclosure, a measurement object included in the information related to the measurement object may include information (e.g., carrier frequency information (e.g., carrierFreq-r15)) relating to a frequency band used to search for a node by the electronic device 101. The carrier frequency information may include a carrier frequency of a frequency band used for node searching, quality measurement, and/or connection. According to various embodiments of the disclosure, the measurement object may be implemented to distinguish between information relating to a frequency band for quality measurement of a node supporting a non-standalone mode of the second cellular communication and information relating to a frequency band for quality measurement of a node supporting a standalone mode. For example, the measurement object may include carrier frequency band information (e.g., carrierFreq-r15) for quality measurement of a node supporting a non-standalone mode and/or carrier frequency band information (e.g., carrierFre-r16) for quality measurement of a node supporting a standalone mode. The electronic device 101 may identify whether the information related to the measurement object includes the carrier frequency band information for quality measurement of the node supporting the non-standalone mode.

According to various embodiments of the disclosure, the measurement object included in the information related to the measurement object may include an indicator indicating whether the measurement object corresponds to a measurement object for performing a standalone mode. A value of an indicator corresponding to the measurement object for performing the standalone mode may be different from a value of an indicator corresponding to a measurement object which does not correspond to the measurement object for performing the standalone mode. The electronic device 101 may parse the information related to the measurement object, and may identify an indicator indicating whether the measurement object included in the information related to the measurement object corresponds to a measurement object performing the non-standalone mode.

According to various embodiments of the disclosure, the measurement object included in the information related to the measurement object may be implemented to be distinguished between a measurement object for performing a standalone mode and a measurement object for performing a non-standalone mode. According to an embodiment, at least partial field of a measurement object (e.g., measObjectNR_SA) for performing the standalone mode and at least partial field of a measurement object (e.g., measObjectNR_NSA) for performing the non-standalone mode may be differently implemented, and the electronic device 101 may identify whether the measurement object corresponds to a measurement object for performing the non-standalone mode, according to the parsing of the measurement object.

According to various embodiments of the disclosure, when it is identified that the information related to the measurement object includes the information related to the non-standalone mode (if "Yes" in operation 930), the electronic device 101 may perform quality measurement using a frequency band corresponding to the non-standalone mode in operation 940.

According to various embodiments of the disclosure, when it is identified that the information related to the measurement object includes the information related to the non-standalone mode, the electronic device 101 may determine to perform a quality measurement object using the frequency band corresponding to the non-standalone mode.

When it is identified that the information related to the measurement object includes carrier frequency band information for quality measurement of a node supporting the non-standalone mode, the electronic device 101 may control the second communication circuit 620 to perform the quality measurement operation using the frequency band corresponding to the non-standalone mode.

When it is identified that the measurement object corresponds to a measurement object for performing the non-standalone mode, the electronic device 101 may control the second communication circuit 620 to perform a quality measurement operation using a frequency band corresponding to the non-standalone mode.

The electronic device 101 may release a part of restriction of the quality measurement through the second cellular communication (e.g., perform a quality measurement operation using a frequency band corresponding to a non-standalone mode), so as to perform data transmission or reception through a non-standalone mode which can provide relatively high speed while a call connection through the first cellular communication is maintained.

According to various embodiments of the disclosure, when it is identified that the information related to the measurement object does not include information related to the non-standalone mode (if "No" in operation 930), the electronic device 101 may maintain the restriction of the quality measurement of the second cellular communication in operation 950.

Figure 10:
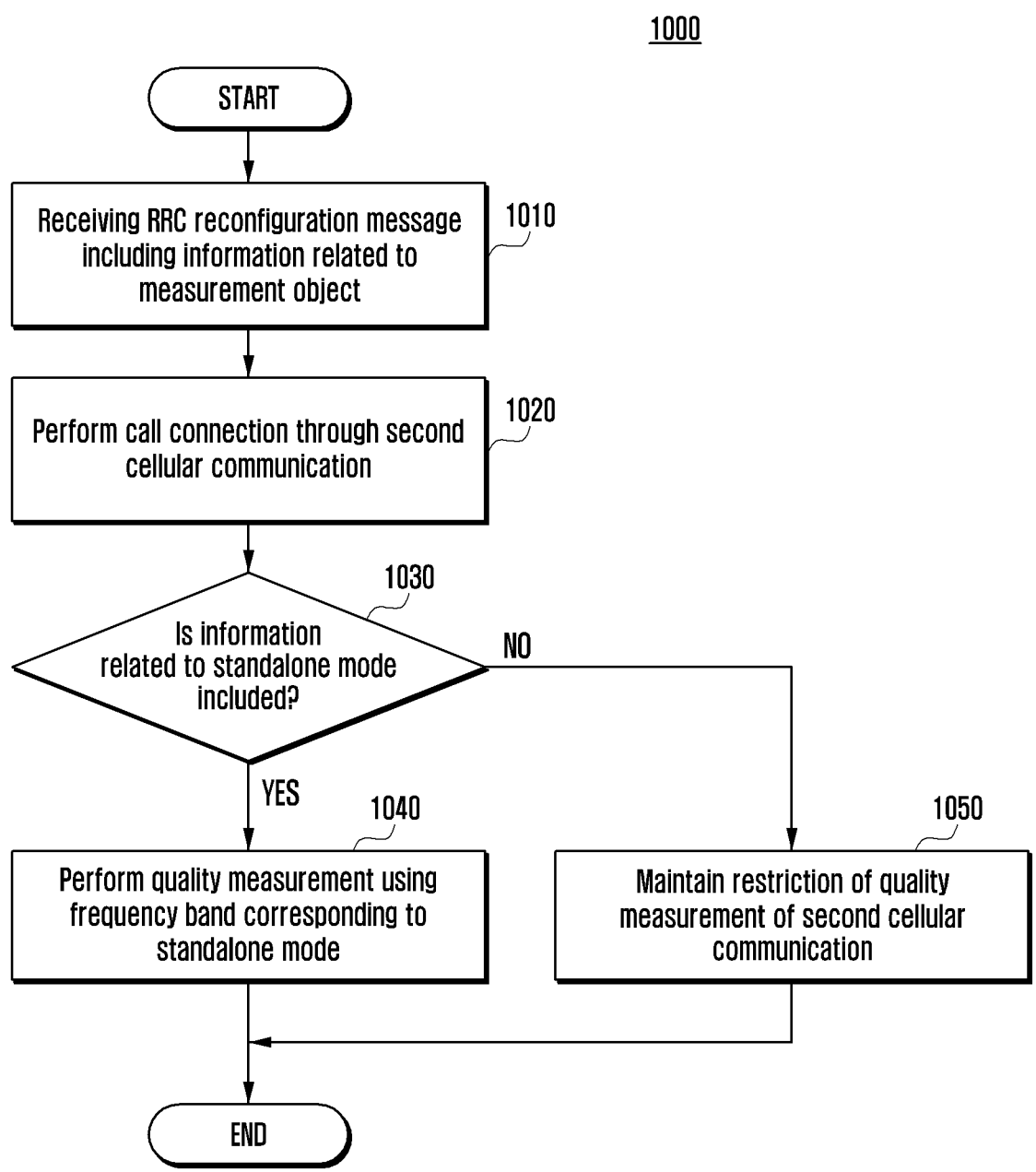
FIG. 10 is a flowchart illustrating an example of determining, by an electronic device, whether to perform quality measurement, according to whether information related to a measurement object includes information related to a standalone mode, during a call connection, according to various embodiments.

FIG. 10 is a flowchart illustrating an example operation 1000 of determining, by an electronic device, whether to perform quality measurement, according to whether information related to a measurement object includes information related to a standalone mode, during a call connection, according to various embodiments.

According to various embodiments of the disclosure, in operation 1010, an electronic device (e.g., the electronic device 101 of FIG. 6) may receive an RRC reconfiguration message including information related to a measurement object.

According to various embodiments of the disclosure, the RRC reconfiguration message may include information related to a measurement object (e.g., measObject) related to at least one node connectable with the electronic device 101 and/or information related to a report condition (report object) of a measurement result.

According to various embodiments of the disclosure, the measurement object may include frequency band information (e.g., channel information) for performing measurement and/or identification information (e.g., a physical cell ID) of a node outputting a signal of a frequency band included in the frequency band information. The electronic device 101 may receive one or more measurement objects through a first communication circuit 610 and/or a second communication circuit 620.

According to various embodiments of the disclosure, in operation 1020, the electronic device 101 may perform a call connection through second cellular communication.

In a state in which the electronic device 101 performs a call connection (e.g., voice over NR) through the second cellular communication, the electronic device 101 may restrict quality measurement through the second cellular communication in order to prevent a call connection (e.g., voice over LTE) through a non-standalone mode of the second cellular communication.

Even though the electronic device 101 can be connected to another node supporting a standalone mode as the movement of the electronic device 101, the quality measurement through the second cellular communication is restricted, whereby a situation in which a connection is made to a node supporting first cellular communication may occur.

According to various embodiments of the disclosure, in operation 1030, the electronic device 101 may identify whether the information related to the measurement object includes information related to the standalone mode.

According to various embodiments of the disclosure, a measurement object included in the information related to the measurement object may include information (e.g., carrier frequency information (e.g., carrierFreq-r15)) relating to a frequency band used to search for a node by the electronic device 101. The carrier frequency information may include a carrier frequency of a frequency band used for node searching, quality measurement, and/or connection. According to various embodiments of the disclosure, the measurement object may be implemented to distinguish between information relating to a frequency band for quality measurement of a node supporting a non-standalone mode of the second cellular communication and information relating to a frequency band for quality measurement of a node supporting a standalone mode. For example, the measurement object may include carrier frequency band information (e.g., carrierFreq-r15) for quality measurement of a node supporting a non-standalone mode and/or carrier frequency band information (e.g., carrierFre-r16) for quality measurement of a node supporting a standalone mode. The electronic device 101 may identify whether the information related to the measurement object includes the carrier frequency band information for quality measurement of the node supporting the standalone mode.

According to various embodiments of the disclosure, the measurement object included in the information related to the measurement object may include an indicator indicating whether the measurement object corresponds to a measurement object for performing a standalone mode. A value of an indicator corresponding to the measurement object for performing the standalone mode may be different from a value of an indicator corresponding to a measurement object which does not correspond to the measurement object for performing the standalone mode. The electronic device 101 may parse the information related to the measurement object, and may identify an indicator indicating whether the measurement object included in the information related to the measurement object corresponds to a measurement object performing the standalone mode.

According to various embodiments of the disclosure, the measurement object included in the information related to the measurement object may be implemented to be distinguished between a measurement object for performing a standalone mode and a measurement object for performing a non-standalone mode. According to an embodiment, at least partial field of a measurement object (e.g., measObjectNR_SA) for performing the standalone mode and at least partial field of a measurement object (e.g., measObjectNR_NSA) for performing the non-standalone mode may be differently implemented, and the electronic device 101 may identify whether the measurement object corresponds to a measurement object for performing the standalone mode, according to the parsing of the measurement object.

According to various embodiments of the disclosure, when it is identified that the information related to the measurement object includes the information related to the standalone mode (if "Yes" in operation 1030), the electronic device 101 may perform quality measurement using a frequency band corresponding to the standalone mode in operation 1040.

According to various embodiments of the disclosure, when it is identified that the information related to the measurement object includes the information related to the standalone mode, the electronic device 101 may determine to perform a quality measurement object using the frequency band corresponding to the standalone mode.

When it is identified that the information related to the measurement object includes carrier frequency band information for quality measurement of a node supporting the standalone mode, the electronic device 101 may control the second communication circuit 620 to perform the quality measurement operation using the frequency band corresponding to the standalone mode.

When it is identified that the measurement object corresponds to a measurement object for performing the standalone mode, the electronic device 101 may control the second communication circuit 620 to perform a quality measurement operation using a frequency band corresponding to the standalone mode.

According to various embodiments of the disclosure, when it is identified that the information related to the measurement object does not include information related to the standalone mode (if "No" in operation 1030), the electronic device 101 may maintain the restriction of the quality measurement of the second cellular communication in operation 1050.

An electronic device according to various example embodiments of the disclosure may include: a first communication circuit configured to support first cellular communication; a second communication circuit configured to support second cellular communication; and a processor, wherein the processor is configured to: control the electronic device to receive an RRC reconfiguration message including information related to a measurement object, in a state in which quality measurement of the second cellular communication is restricted, identify whether the information related to the measurement object includes information related to a standalone mode of the second cellular communication, determine whether to perform quality measurement using a frequency band corresponding to the standalone mode, based on a result of the identification, and determine whether to transmit a result of the quality measurement, based on the result of the quality measurement.

In an electronic device according to various example embodiments of the disclosure, based on the information related to the measurement object including the information related to the standalone mode, the processor may be configured to control the second communication circuit to perform the quality measurement.

In an electronic device according to various example embodiments of the disclosure, the information related to the standalone mode may include carrier frequency information of a frequency band to be used for a connection to a node supporting the standalone mode.

In an electronic device according to various example embodiments of the disclosure, the information related to the standalone mode may include information indicating that the information related to the measurement object corresponds to information for the standalone mode.

In an electronic device according to various example embodiments of the disclosure, based on the information related to the measurement object not including the information related to the standalone mode, the processor may be configured to control the second communication circuit to maintain restriction of the quality measurement of the second cellular communication.

In an electronic device according to various example embodiments of the disclosure, the RRC reconfiguration message may include information related to a report of the measurement result, wherein based on identifying that the information related to the report of the measurement result includes a condition related to quality of a node supporting the standalone mode, the processor may be configured to control the second communication circuit to perform quality measurement using a frequency band included in the information related to the measurement object.

An electronic device according to various example embodiments of the disclosure may further include a memory configured to store data indicating whether to perform quality measurement based on measurement object identification information, wherein the processor is configured to determine whether to perform the quality measurement, based on the data and the measurement object identification information included in the information related to the measurement object.

In an electronic device according to various example embodiments of the disclosure, the processor may be configured to determine whether to perform the quality measurement, based on time to trigger (TTT) information included in the information related to the report of the measurement result.

In an electronic device according to various example embodiments of the disclosure, in a state in which data communication is performed through the first cellular communication and a connection through a non-standalone mode of the second cellular communication is restricted, based on the information related to the measurement object including the information related to the standalone mode, the processor may be configured to control the second communication circuit to perform the quality measurement.

In an electronic device according to various example embodiments of the disclosure, in a state in which a call connection is performed through the first cellular communication and a connection through the standalone mode is restricted, based on the information related to the measurement object including information related to a non-standalone mode of the second cellular communication, the processor may be configured to control the second communication circuit to perform quality measurement using a frequency band corresponding to the non-standalone mode.

In an electronic device according to various example embodiments of the disclosure, in a state in which a call connection is performed through the second cellular communication and a connection through a non-standalone mode is restricted, based on the information related to the measurement object including the information related to the standalone mode, the processor may be configured to control the second communication circuit to perform quality measurement using a frequency band corresponding to the standalone mode.

According to an example embodiment, a method of operating an electronic device supporting first cellular communication and/or second cellular communication may include: receiving an RRC reconfiguration message including information related to a measurement object, in a state in which quality measurement of the second cellular communication is restricted; identifying whether the information related to the measurement object includes information related to a standalone mode of the second cellular communication; determining whether to perform quality measurement using a frequency band corresponding to the standalone mode, based on a result of the identification; and determining whether to transmit a result of the quality measurement, based on the result of the quality measurement.

In the method of the electronic device according to various example embodiments of the disclosure, the determining of whether to perform the quality measurement may include determining to perform the quality measurement based on the information related to the measurement object including the information related to the standalone mode.

In the method of the electronic device according to various example embodiments of the disclosure, the information related to the standalone mode may include carrier frequency information of a frequency band to be used for a connection to a node supporting the standalone mode.

In the method of the electronic device according to various example embodiments of the disclosure, the information related to the standalone mode may include information indicating that the information related to the measurement object corresponds to information for the standalone mode.

The method of the electronic device according to various example embodiments of the disclosure may further include maintaining restriction of the quality measurement of the second cellular communication based on the information related to the measurement object not including the information related to the standalone mode.

The method of the electronic device according to various example embodiments of the disclosure may further include performing quality measurement using a frequency band included in the information related to the measurement object based on identifying that the information related to a report of the measurement result includes a condition related to quality of a node supporting the standalone mode, wherein the RRC reconfiguration message includes information related to the report of the measurement result.

The method of the electronic device according to various example embodiments of the disclosure may further include determining whether to perform the quality measurement, based on measurement object identification information included in the measurement object-related information included in the RRC reconfiguration message, and data indicating whether to perform quality measurement based on the measurement object identification information.

The method of the electronic device according to various example embodiments of the disclosure may further include determining whether to perform the quality measurement, based on time to trigger (TTT) information included in the information related to the report of the measurement result.

The method of the electronic device according to various example embodiments of the disclosure may further include performing the quality measurement based on the information related to the measurement object including the information related to the standalone mode in a state in which data communication is performed through the first cellular communication and a connection through a non-standalone mode of the second cellular communication is restricted.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art the various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
 a first communication circuit configured to support first cellular communication;
 a second communication circuit configured to support second cellular communication; and
 a processor configured to:
 control the electronic device to receive a radio resource control (RRC) reconfiguration message including information related to a measurement object, in a state in which quality measurement of the second cellular communication is restricted,
 identify whether the information related to the measurement object includes information related to a standalone mode of the second cellular communication, the information related to the standalone mode including information indicating that a node corresponding to the measurement object supports standalone mode of the second cellular communication,
 based on identification that the information related to the measurement object includes information related to a standalone mode of the second cellular communication, perform quality measurement using a frequency band corresponding to the standalone mode,
 determine whether to transmit a result of the quality measurement, based on a result of the quality measurement, and
 based on identification that the information related to the measurement objects does not includes the information related to the standalone mode of the second cellular communication, refrain from the performing the quality measurement using the frequency band corresponding to the standalone mode and maintain a connection of the first cellular communication.

2. The electronic device of claim 1, wherein the information related to the standalone mode comprises carrier frequency information of a frequency band to be used for a connection to a node supporting the standalone mode.

3. The electronic device of claim 1, wherein the information related to the standalone mode comprises information indicating that the information related to the measurement object corresponds to information for the standalone mode.

4. The electronic device of claim 1, wherein the RRC reconfiguration message comprises information related to a report of the measurement result, and
 wherein based on identifying that the information related to the report of the measurement result comprises a condition related to quality of a node supporting the standalone mode, the processor is configured to control the second communication circuit to perform quality measurement using a frequency band included in the information related to the measurement object.

5. The electronic device of claim 4, wherein the processor is configured to determine whether to perform the quality measurement, based on time to trigger (TTT) information included in the information related to the report of the measurement result.

6. The electronic device of claim 1, further comprising a memory configured to store data indicating whether to perform quality measurement based on measurement object identification information,
 wherein the processor is configured to determine whether to perform the quality measurement, based on the data and the measurement object identification information included in the information related to the measurement object.

7. The electronic device of claim 1, wherein in a state in which data communication is performed through the first cellular communication and a connection through a non-standalone mode of the second cellular communication is restricted, based on the information related to the measurement object comprising the information related to the standalone mode, the processor is configured to control the second communication circuit to perform the quality measurement.

8. The electronic device of claim 1, wherein in a state in which a call connection is performed through the first cellular communication and a connection through the standalone mode is restricted, based on the information related to the measurement object comprising information related to a non-standalone mode of the second cellular communication, the processor is configured to control the second communication circuit to perform quality measurement using a frequency band corresponding to the non-standalone mode.

9. The electronic device of claim 1, wherein in a state in which a call connection is performed through the second cellular communication and a connection through a non-standalone mode is restricted, based on the information related to the measurement object comprising the information related to the standalone mode, the processor is configured to control the second communication circuit to perform quality measurement using a frequency band corresponding to the standalone mode.

10. A method of operating an electronic device supporting first cellular communication and/or second cellular communication, the method comprising:
 receiving a radio resource control (RRC) reconfiguration message including information related to a measurement object, in a state in which quality measurement of the second cellular communication is restricted;
 identifying whether the information related to the measurement object includes information related to a standalone mode of the second cellular communication, the information related to the standalone mode including information indicating that a node corresponding to the measurement object supports standalone mode of the second cellular communication;
 based on identification that the information related to the measurement object includes information related to a standalone mode of the second cellular communication, performing quality measurement using a frequency band corresponding to the standalone mode; and
 determining whether to transmit a result of the quality measurement, based on a result of the quality measurement, and
 based on identification that the information related to the measurement objects does not includes the information related to the standalone mode of the second cellular communication, refraining from the performing the quality measurement using the frequency band corresponding to the standalone mode and maintaining a connection of the first cellular communication.

11. The method of claim 10, wherein the information related to the standalone mode comprises carrier frequency information of a frequency band to be used for a connection to a node supporting the standalone mode.

12. The method of claim 10, wherein the information related to the standalone mode comprises information indicating that the information related to the measurement object corresponds to information for the standalone mode.

13. The method of claim 10, further comprising performing quality measurement using a frequency band included in the information related to the measurement object based on identifying that the information related to a report of the measurement result comprises a condition related to quality of a node supporting the standalone mode,
wherein the RRC reconfiguration message comprises information related to the report of the measurement result.

14. The method of claim 10, further comprising determining whether to perform the quality measurement, based on measurement object identification information included in the measurement object-related information included in the RRC reconfiguration message, and data indicating whether to perform quality measurement according to the measurement object identification information.

15. The method of claim 10, further comprising determining whether to perform the quality measurement, based on time to trigger (TTT) information included in the information related to the report of the measurement result.

16. The method of claim 10, further comprising performing the quality measurement based on the information related to the measurement object comprising the information related to the standalone mode in a state in which data communication is performed through the first cellular communication and a connection through a non-standalone mode of the second cellular communication is restricted.

* * * * *